United States Patent
Mohapatra

(10) Patent No.: US 9,005,471 B2
(45) Date of Patent: Apr. 14, 2015

(54) HEAT TRANSFER FLUID CONTAINING NANO-ADDITIVE

(75) Inventor: Satish Chandra Mohapatra, Easton, PA (US)

(73) Assignee: Dynalene Inc. PA (US)

( * ) Notice: Subject to any disclaimer, the term of this patent is extended or adjusted under 35 U.S.C. 154(b) by 169 days.

(21) Appl. No.: 13/009,066

(22) Filed: Jan. 19, 2011

(65) Prior Publication Data

US 2011/0175017 A1 Jul. 21, 2011

Related U.S. Application Data

(60) Provisional application No. 61/296,030, filed on Jan. 19, 2010.

(51) Int. Cl.
*C09K 5/10* (2006.01)
(52) U.S. Cl.
CPC .......................................... *C09K 5/10* (2013.01)
(58) Field of Classification Search
None
See application file for complete search history.

(56) References Cited

U.S. PATENT DOCUMENTS

| 6,432,320 | B1 | 8/2002 | Bonsignore et al. |
| 6,620,402 | B2 | 9/2003 | Jacobsen et al. |
| 6,783,746 | B1 * | 8/2004 | Zhang et al. ................ 423/447.1 |
| 7,005,118 | B2 | 2/2006 | Terres Rojas et al. |
| 7,100,263 | B2 | 9/2006 | Imada et al. |
| 7,348,298 | B2 * | 3/2008 | Zhang et al. .................. 508/113 |
| 7,374,698 | B2 | 5/2008 | Wu |
| 2007/0134151 | A1 | 6/2007 | Jo et al. |

* cited by examiner

*Primary Examiner* — Necholus Ogden, Jr.
(74) *Attorney, Agent, or Firm* — Ash Tankha; Lipton, Weinberger & Husick

(57) ABSTRACT

A heat transfer fluid comprising a carrier fluid and a nano-additive is provided. The heat transfer fluid is manufactured by dispersing the nano-additive in the carrier fluid. The nano-additive comprises nano-particles having a porous structure that provides dispersion stability of the nano-additive in the heat transfer fluid. The nano-additive structure has an aspect ratio of about 1.0 to about 10,000, a porosity of about 40% to about 85%, a density of about 0.4 g/cc to about 3.0 g/cc, an average pore diameter of about 0.1 nanometer to about 100 nanometers, and a specific surface area of about 1 $m^2$/g to about 4000 $m^2$/g. The nano-additive increases the heat transfer efficiency of the heat transfer fluid and also reduces the moisture content of the heat transfer fluid.

4 Claims, 1 Drawing Sheet

HEAT TRANSFER FLUID CONTAINING NANO-ADDITIVE

CROSS REFERENCE TO RELATED APPLICATIONS

This application claims the benefit of provisional patent application No. 61/296,030 titled "Heat Transfer Fluid Containing Nano-additive", filed on Jan. 19, 2010 in the United States Patent and Trademark Office.

The specification of the above referenced patent application is incorporated herein by reference in its entirety.

FIELD OF THE INVENTION

This invention, in general, relates to heat transfer fluids containing a nano-additive, and more particularly, this invention relates to increasing the heat transfer efficiency and reducing the moisture content of a non-aqueous heat transfer fluid using a nano-additive.

BACKGROUND

Heat transfer fluids are used in a variety of applications including reactor cooling/heating, plastic molding, constant temperature baths, automotive coolant systems, cold storage, climactic chambers, heating, air-conditioning, etc. The primary objective of a heat transfer fluid is to remove heat from the source and transfer the heat to a sink. In a typical heat transfer fluid loop, the heat transfer fluid is pumped through heat exchangers or jackets. The heat transfer fluid either adds or removes heat from the process thereby maintaining a stable temperature.

Non-aqueous heat transfer fluids are normally used in extremely low or high temperature applications where water-based heat transfer fluids cannot operate due to freezing or boiling problems. Non-aqueous heat transfer fluids have lower heat transfer efficiency compared to water-based fluids because the non-aqueous heat transfer fluids have lower specific heat and thermal conductivity compared to the water-based heat transfer fluids. Improving the efficiency of a heat transfer process by 20% to 25% could lead to significant savings in energy and equipment. Hence, there is a need for improving the efficiency of the heat transfer fluids.

Nano-additive particles made from copper, silver, and iron suspended in a heat transfer fluid improve the thermal conductivity as well as convective heat transfer coefficient of that fluid. However, the nano-additive particles do not disperse well in the heat transfer fluid due to their significant density difference with the carrier fluid. When surfactants are used to disperse nano-additive particles in the heat transfer fluid, the surface of the nano-additive particles gets covered with the surfactant and diminishes the effectiveness of the nano-additive particles for enhancing the thermal conductivity of the heat transfer fluid.

Another common problem associated with non-aqueous heat transfer fluids is the presence of moisture in the heat transfer fluid. Moisture could enter into the heat transfer fluid during installation, or when the heat transfer fluid is re-circulated during the operation of the system. When a heat transfer fluid goes through temperature cycles, the expansion and contraction of the heat transfer fluid allows outside air to contact the heat transfer fluid. This inflow of outside air into the re-circulating heat transfer fluid adds moisture to the heat transfer fluid. In low temperature applications, the moisture can freeze and form ice crystals in the heat transfer fluid and cause problems in the re-circulating heat transfer fluid loop. Moisture can also result in degradation of the heat transfer fluid. In certain applications, such as in dielectric switches, a very low concentration of moisture is desired in the heat transfer fluid in order to maintain a very high dielectric strength of the heat transfer fluid. Therefore, removal of moisture from heat transfer fluids, or maintenance of moisture at a certain reduced level is a concern. Existing methods remove moisture from a non-aqueous heat transfer fluid by passing the heat transfer fluid through a bed of the desiccant or molecular sieve. This method could be used in-line or as a bypass stream of the primary heat transfer fluid loop. If a desiccant bed is used in-line, the pressure drop in the re-circulating heat transfer fluid loop increases, thus requiring the use of a higher horsepower pump. Additionally, the system/process must be shut down completely in order to change the desiccant from the re-circulating system. If the desiccant bed is used in a by-pass stream, that is, a slip-stream, the flow rate of the heat transfer fluid in this stream is much smaller than the flow rate in the main heat transfer fluid loop, which in turn requires an extended time, sometimes months, for removal of the moisture present in a non-aqueous heat transfer fluid.

Hence, there is long felt but unresolved need for a heat transfer fluid that provides better heat transfer efficiency than its base or carrier fluid and that maintains the moisture content of the carrier fluid below a threshold level.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The heat transfer fluid (HTF) and the method disclosed herein addresses the above stated need for improving the heat transfer efficiency of the HTF as well as removing moisture from a carrier fluid. The heat transfer fluid disclosed herein comprises a carrier fluid and a nano-additive suspended in the carrier fluid to improve the heat transfer efficiency of the heat transfer fluid and to also reduce moisture in the heat transfer fluid.

"Nano-additives" as used herein comprise any one or more of the following: nano-particles, molecular sieves, porous materials, nano-powders, nano-fibers, and desiccants. These nano-additives are defined and distinguished based on their properties such as aspect ratio, size, porosity, etc.

The nano-additive comprises a highly porous structure nano-particle, molecular sieve, porous material, nano-powder, nano-fiber or a desiccant, with a density close to the density of the carrier fluid to decrease the rate of settling out of the nano-additive from the carrier fluid in which the nano-additive is suspended. In an embodiment, the density of the nano-additive is within about 10% to about 200% of the density of the carrier fluid. In another embodiment, the density of the nano-additive is within 50% of the density of the carrier fluid. In another embodiment, the density of the nano-additive is about 0.1% to about 10% of the density of the carrier fluid, thereby allowing the nano-additive to be entrained and in a state of suspension in the re-circulating heat transfer fluid flow. The concentration of the nano-additive is about 0.01% to about 20% by weight of the heat transfer fluid. The shape of the nano-additive is, for example, a spherical shape, a cylindrical shape, a plate-like shape, a fibrous shape or can have any other shape. The heat transfer fluid is manufactured by dispersing one or more nano-additives in the carrier fluid. The nano-additive comprises, for example, zeolite, silica, alumina, porous carbon, activated porous carbon, and fibrous carbon.

The nano-additive structure has an aspect ratio of about 1.0 to about 10,000, a porosity of about 40% to about 85%, a density of about 0.4 g/cc to about 3.0 g/cc, an average pore diameter of about 0.1 nanometer to about 100 nanometers, and a specific surface area of about 1 $m^2/g$ to about 4000 $m^2/g$.

The heat transfer fluid is made by sonication and homogenization of the nano-additive in the carrier fluid to disperse the nano-additives in the carrier fluid. The porous nano-additive improves the heat transfer coefficient of the heat transfer fluid by increasing the thermal conductivity as well as the convective heat transfer coefficient of the heat transfer fluid. The nano-additive also adsorbs and entraps dissolved moisture inside the porous structure of the nano-additive. In an embodiment, the nano-additive adsorbs about 1% to about 20% of its weight of moisture from the carrier fluid in the porous structure of the nano-additive. The heat transfer fluid and the method disclosed herein reduce the maintenance costs of the heat transfer system.

DETAILED DESCRIPTION OF THE INVENTION

Figure 1:
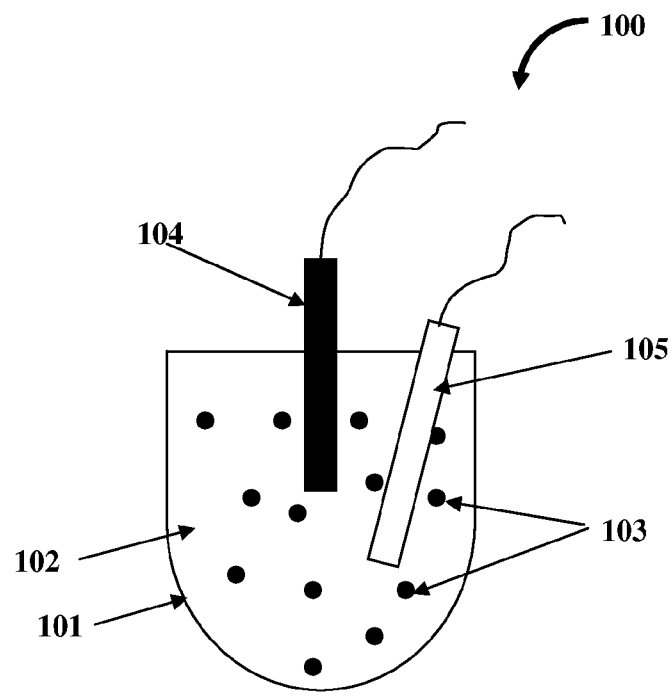
FIG. 1 exemplarily illustrates a manufacturing set-up for manufacturing a heat transfer fluid containing nano-additives.

The heat transfer fluid (HTF) disclosed herein is a non-aqueous fluid containing a nano-additive that increases the heat transfer efficiency by increasing thermal conductivity of the heat transfer fluid and reduces the moisture content of the heat transfer fluid by entrapping water molecules inside its porous structure. The heat transfer fluid disclosed herein comprises a carrier fluid and the nano-additive suspended in the carrier fluid. The nano-additive is, for example, of a spherical shape, a cylindrical shape, a plate-like shape, a fibrous shape, or a random shape. In an embodiment, the density of the nano-additive is about 10% to about 200% of the density of the carrier fluid. In another embodiment, the density of the nano-additive is about 0.1% to about 10% of the density of the carrier fluid, thereby allowing the nano-additive to be entrained and in a state of suspension in the re-circulating heat transfer fluid flow. In an embodiment, the nano-additive adsorbs from about 1% to about 20% of its weight of moisture from the carrier fluid in the porous structure of the nano-additive. Also, in an embodiment, the concentration of the nano-additive is about 0.01% to about 20% by weight of the heat transfer fluid.

As used herein, "high thermal conductivity" refers to a thermal conductivity that is at least 5% higher than the thermal conductivity of the carrier fluid. Also, as used herein, "low moisture content" refers to moisture content of less than 200 parts per million (ppm) in a non-aqueous heat transfer fluid. Also, as used herein, "carrier fluid" refers to the heat transfer medium in which the nano-additive is suspended. In an embodiment, the heat transfer fluid disclosed herein has a thermal conductivity about 10% higher than the carrier fluid. In another embodiment, the thermal conductivity of the heat transfer fluid disclosed herein is 20% higher than the carrier fluid. In an embodiment, the nano-particle reduces the moisture content in the heat transfer fluid to between about 1% to about 100 ppm, for example, 10 ppm.

The thermal conductivity of the heat transfer fluid disclosed herein may be measured using any commercially available thermal conductivity meter. For example, a laser flash based thermal conductivity meter manufactured by Netschz Instruments could be used. Separately, hot wire, transient plane or a steady state method could also be used to determine the thermal conductivity of the heat transfer fluid.

The moisture content of the heat transfer fluid may be measured using any commercially available Karl-Fisher titrimeter. A coulomatic or a volumetric titrimeter could be used for this measurement.

The heat transfer fluid disclosed herein comprises a carrier fluid, which is a commercially available heat transfer fluid, for example, a hydrocarbon oil such as Dynalene MV from Dynalene Inc., or a silicone oil such as Syltherm XLT from Dow Chemicals, or a non-aqueous fluid with good thermal and physical properties, for example, low viscosity and high thermal conductivity and heat capacity. This carrier fluid should have attributes of a good heat transfer fluid. These attributes are, for example, low toxicity, low flammability, high boiling point, and good environmental characteristics. Examples of carrier fluids are aliphatic and aromatic hydrocarbons, alkyl aromatics, polyalphaolefins (PAOs), terpenes, alcohols, ketones, silicones, ionic liquids, fluorocarbons, perfluorocarbons, chlorofluorocarbons (CFCs), hydrofluorocarbons (HFCs), perfluoropolyethers (PFEs), and their mixtures. In the heat transfer fluid disclosed herein, the weight percentage of the carrier fluid in the heat transfer fluid varies from about 80 to about 99.9%. The carrier fluid disclosed herein has a density of about 0.6 g/cc to about 2.0 g/cc. For example, a linear aliphatic hydrocarbon such as pentane has a density of about 0.6 g/cc, whereas a fluorocarbon could have a density of about 1.8 g/cc.

The heat transfer fluid disclosed herein comprises a nano-additive designed to increase the heat transfer efficiency and reduce the moisture content of the heat transfer fluid. A nano-additive is defined as a nano-particle, molecular sieve, porous material, nano-powder, nano-fiber, desiccant or any mixture of these materials of any shape where at least one of its dimensions is in the range of 0.5 nanometers (nm) to 5000 nm. The addition of appropriate nano-additives to a carrier fluid increases its thermal conductivity significantly. Several mechanisms and models propose the involvement of Brownian motion of the nano-additive particles, molecular level layering of the liquid at the liquid/particle interface, the nature of heat transport in the nano-additive particles, and the effects of nano-additive particle clustering in the enhancement of thermal conductivity of the base fluid. The role of interfacial layers as well as the particle size in the enhancement of thermal conductivity is well recognized. Greater thermal conductivity enhancement can be obtained by lowering the particle/agglomerate size, increasing the particle thermal conductivity, and increasing the volume ratio of the particles to the liquid volume. A non-spherical particle or tubular/rod shapes or linearly aggregated chain-like clusters show greater thermal conductivity enhancement than a spherical particle. The fibrous clusters form an interpenetrating network near the wall of the heat exchanger, thereby improving the heat transfer properties.

The effect of fibrous nano-additives on the heat transfer is profound. Such effect could be three fold: (1) increase of fluid thermal conductivity, (2) increase of the temperature gradient, and (3) increase in particle density near the wall due to the Saffman effect.

Nano-particles disclosed herein are characterized by specific values of parameters such as the nano-particle shape, average pore size, porosity, density, specific surface area, etc.

In an embodiment, the nano-additive is a spherical, microporous, nano-particle. The average diameter of this nano-particle is from about 0.5 nm to about 5000 nm.

The average pore size of a nano-particle is the diameter of the pore in the nano-particle and varies from about 0.1 nm to about 100 nm. The pores could be uniformly or randomly distributed throughout the interior of the nano-particle. The size distribution of the pores in a nano-additive could vary significantly. For example, a nano-additive has pore sizes ranging from about 0.5 nm to about 10 nm. The smaller size pores are required for the removal of moisture from the heat transfer fluid, whereas the bigger size pores are needed to increase the porosity of the particles in order to bring the nano-additive density closer to the carrier fluid.

Another parameter of a nano-particle is its porosity. "Porosity" is defined as the void volume as a percentage of the total volume of a nano-additive. Porosity is an important parameter for a nano-additive because porosity determines how much moisture could be entrapped in the nano-additives as well as the true density of the nano-additives. A porosity range of the nano-additives disclosed herein is about 40% to about 85% range.

Another parameter of a nano-additive is its aspect ratio. "Aspect ratio" is defined as the ratio of the length of the nano-additive to its diameter. For example, a rod-shaped nano-additive with a length of 5 microns or 5000 nm and a diameter of 100 nm will have an aspect ratio of 50. Aspect ratio nano-additives, for example, rods, tubes, plates, etc., improve the thermal conductivity and the heat transfer efficiency of heat transfer fluids at a rate higher than the low aspect ratio nano-additives, for example, spheres. The range of aspect ratio chosen for the nano-additive disclosed herein is from 1 (sphere) to 10,000 (carbon nano-fibers).

Another parameter of a nano-additive is its density. The "density" of the nano-additive is defined as the weight per volume of each individual particle. Sometimes, it is also referred to as the "true density" of the nano-additive. For nano-additives disclosed herein, a density range of 0.4 g/cc to about 3.0 g/cc is used. A low density nano-additive could be used with a low density carrier fluid for better stability of the dispersion. Similarly, a higher density nano-additive could be used with a higher density carrier fluid.

Another parameter for the nano-additive is its specific surface area. The "specific surface area" is defined as the total surface area, including the pores, in a unit weight of the nano-additive. The higher the specific surface area, the higher is the capacity for moisture adsorption. The range for the specific surface area of the nano-additive disclosed herein is from about 1 $m^2/g$ to about 4000 $m^2/g$.

The weight percentage of the nano-additive in the carrier fluid varies from about 0.01% to about 20% of the weight of the carrier fluid. The higher the concentration of the nano-additive in the heat transfer fluid, the higher is the thermal conductivity of the heat transfer fluid. Higher concentration of nano-additives also provides moisture removal from the heat transfer fluid for a longer period of time before the nano-additives are saturated and need to be replaced.

Examples of commercially available nano-additive materials are zeolite, silica, alumina, porous carbon, activated porous carbon, and fibrous carbon.

Commercially available zeolite molecular sieve (W. R. Grace Co., Cambridge, Mass.) are crystalline, highly porous materials, which belong to the class of alumino silicates. These crystals are characterized by a three-dimensional pore system, with pores of a precisely defined diameter. This diameter of the pores is in the dimension of the size of molecules such as water, $CO_2$ and $H_2S$. The pores can be adjusted to precise uniform openings to allow for molecules smaller than its pore diameter to be adsorbed while excluding larger molecules, hence the name "molecular sieve". The different pore sizes of synthetic zeolites open up a wide range of possibilities in terms of "sieving" molecules of different size or shape from liquids.

Due to the presence of alumina, zeolites exhibit a negatively charged framework, which is counter-balanced by positive cations resulting in a strong electrostatic field on the internal surface. These cations can be exchanged to fine-tune the pore size or the adsorption characteristics. For instance, the sodium form of zeolite A has a pore opening of approximately 4 Ångstrom (0.4 nm), called 4 A molecular sieve. If the sodium ion is exchanged with the larger potassium ion, the pore opening is reduced to approximately 3 Ångstrom (3 A molecular sieve). On ion exchange with calcium, one calcium ion replaces two sodium ions. Thus, the pore opening increases to approximately 5 Ångstrom (5 A molecular sieve). Ion exchange with other cations is sometimes used for particular separation purposes.

The up-take of water in zeolites is called adsorption and functions on the basis of physisorption. The main driving force for adsorption is the highly polar surface within the pores. This unique characteristic distinguishes zeolites from other commercially available adsorbents, enabling an extremely high adsorption capacity for water and other polar components even at very low concentrations.

Another example of a commercially available nano-additive is a series of micro-porous carbon nano-particles from Y-Carbon Inc. (King of Prussia, Pa.). The aspect ratio of these nano-particles is about 1.0. The porosity of the nano-particles is about 50% to about 80%. The average pore size of the nano-particles varies from about 0.5 nm to about 30 nm. The specific surface area of the nano-particle varies from about 1500 $m^2/g$ to about 3500 $m^2/g$. The density of the carbon nano-particles varies from about 0.17 g/cc to about 1.04 g/cc.

Another commercial source of nano-additives is a molecular sieve from Hengye USA, Bensenville, Ill. As an example, their PG-4AMS molecular sieve has an average pore size of about 0.4 nm. The density of the particles is about 2.1 to 2.3 g/cc. The molecular sieve particles are available in diameter range from about 1.6 mm to about 8 mm. Hence, they have to be milled and ground to a size range as disclosed herein. Another product from the same supplier, PG-4AWD, has a particle size (diameter) of 2000 nm to 4000 nm. This material could be used as a nano-additive directly without any size reduction.

Another commercial source for several nano-additives is US Research Nanomaterials, Inc. (Houston, Tex.). The materials available are aluminum oxide nano-powder (aspect ratio of 1.0, average particle size of 80 nm and 15 m2/g of specific surface area), super activated porous carbon nano-powder (particle size: 20-40 nm, pore size 2-5 nm, density: 0.44 g/cc, specific surface area: 1400 m2/g, aspect ratio: 1.0, and porosity: about 50%), carbon nano-fibers (density:2.1 g/cc, aspect ratio: 10-250, and specific surface area: 18 m2/g), super activated carbon nano-powder (particle size:<100 nm, aspect ratio: 1.0, porosity: 50%, density: 0.45 g/cc, and specific surface area: 300 m2/g), and silicon oxide (silica) nano-powder (particle size: 20-30 nm, density: 2.4 g/cc, specific surface area: 180-600 m2/g, and aspect ratio: about 1.0).

Another commercial source for several porous nano-particles is Nanomaterialstore.com (Fremont, Calif.).

The nano-additive is added and dispersed in the carrier fluid, for example, by three methods. In the first method, the nano-additive is mixed with the carrier fluid in a small mixing tank, for example, a beaker, at a very high concentration of the nano-additive, for example, about 20% by weight of the heat transfer fluid. This concentrated nano-additive dispersion is then added to the carrier fluid and mixed in a big mixing tank until the desired concentration of the nano-additive in the heat transfer fluid is obtained. In the second method, the nano-additive is added directly to the carrier fluid and mixed with the carrier fluid until the desired concentration of the nano-additive in the heat transfer fluid is obtained. In the third method, the nano-additive or the concentrated dispersion of the nano-additive is added to the carrier fluid in a heat transfer fluid system. The resultant fluid is then re-circulated for several hours using the pump in the system to disperse the nano-additive in the carrier fluid.

The nano-additive in the heat transfer fluid disclosed herein may also be removed from the heat transfer fluid when needed. For example, when the nano-additive gets saturated with moisture and loses its capacity to absorb moisture from the heat transfer fluid, the nano-additive may be separated and removed from the heat transfer fluid and a fresh batch of nano-additive or its concentrated dispersion may be added directly into the re-circulating heat transfer fluid loop. The nano-additive separation could be performed using inline or bypass filters or cyclone separators.

In an example of a heat transfer fluid, a dispersion of alumino silicate (zeolite) nano-additives in a poly alpha olefin (PAO) fluid is prepared. Normally, alumino silicate is extremely difficult to stabilize in a hydrocarbon such as PAO due to its density difference between the heat transfer fluid. Use of a surfactant or a dispersant to stabilize these nano-additives is possible, but addition of these ingredients will change the thermal and physical properties of the PAO fluid, resulting in a less efficient heat transfer fluid heat transfer fluid HTF. Therefore, a type of highly porous alumina silicate (molecular sieve) is purchased and ground to 100 nm size. This provides a nano-additive with density close to the density of the PAO fluid.

In another experiment, the nano-additive used was porous carbon nano-particles from Y-Carbon Inc., King of Prussia, Pa. The porous carbon nano-particles have a high porosity of about 50% to about 80% resulting in a nano-particle density within about 10% to about 50% of the carrier fluids.

The porous carbon nano-particle adsorbs about 10% of its weight of moisture at thermodynamic equilibrium. About 0.1% by weight of this micro-porous carbon nano-particle in the dispersion adsorbs about 100 ppm of moisture. The micro-porous carbon nano-particles are dispersed in a carrier fluid using an ultra-sonication and a homogenization apparatus. Particle size and moisture content as a function of dispersion time are measured to determine if the dispersion is stable. A high speed homogenizer was used to continuously mix the dispersion while the ultrasonic device broke down the agglomerates.

A hydrophobic carbon nano-particle was easier to disperse in a hydrocarbon medium such as the poly alpha olefin (PAO) fluid. Hydrophilic materials tend to aggregate in a hydrocarbon medium. Since the densities of these porous carbon nano-particles are approximately in the same range as that of the carrier fluid, the porous carbon nano-particles do not settle out from the heat transfer fluid in the re-circulating heat transfer fluid system, even if the porous carbon nano-particles aggregate. In an experiment, dispersions of 200 ml to 500 ml batches were produced with about 0.1 to 0.5% by weight of porous carbon nano-particles. Visual checks were performed for any settling of the particles. PAO samples without porous carbon nano-particles were prepared with different amount of water content using traditional molecular sieves and tested. Tests were carried out for particle size using NICOMP particle size analyzer, stability of dispersion with time visually, moisture content before and after dispersion, and also with respect to time by the Karl-Fisher Technique, composition analysis by gas chromatography and Fourier transform infrared technique. Thermal conductivities of the carrier fluids with and without the nano-particle were also determined using a laser flash apparatus.

EXAMPLE 1

A heat transfer fluid composition was prepared using the following steps:
(1) 500 ml of commercially available hydrocarbon based HTF, Dynalene MV (Dynalene Inc.), was obtained and placed in a glass beaker. The glass beaker was placed in an ice bath. A sample of the fluid was removed and tested for moisture content and thermal conductivity.
(2) 0.42 g of porous carbon nano-particles (from Y-Carbon, King Of Prussia, Pa.) of an average diameter 20 nm was added to the hydrocarbon fluid.
(3) A homogenizer and a wand type sonicator were placed in the fluid.
(4) Homogenization and sonication were carried out simultaneously for about 10 minutes.
(5) A sample of the heat transfer fluid was removed and tested for the nano-additive particle/agglomerate size distribution. An average size of 120 nm was obtained.
(6) A sample of the heat transfer fluid was also tested for moisture content and thermal conductivity.
(7) The moisture content of the heat transfer fluid was reduced from about 135 ppm to about 95 ppm and maintained there for a long period of time. The thermal conductivity of the heat transfer fluid increased from 0.16 W/m.K to 0.175 W/m.K.

EXAMPLE 2

A heat transfer fluid composition was prepared using the following steps:
(1) 700 ml of commercially available silicone based HTF, Syltherm XLT (Dow Chemicals, Midland, Mich.), was obtained and placed in a glass beaker. The glass beaker was placed in an ice bath. A sample of the fluid was removed and tested for moisture content and thermal conductivity.
(2) 6.0 g of 13X molecular sieve (purchased from Aldrich Chemicals) was ground to 100 nm particles using a micronizer device. The resultant particles were added to the silicone fluid in the beaker.
(3) A homogenizer and a wand type sonicator were placed in the fluid.
(4) Homogenization and sonication were carried out simultaneously for about 30 minutes.
(5) A sample of the heat transfer fluid was removed and tested for the particle/agglomerate size distribution. An average size of 200 nm was obtained.
(6) The sample of the heat transfer fluid was also tested for moisture content and thermal conductivity.
(7) The moisture content of the heat transfer fluid was reduced from about 150 ppm to about 55 ppm and maintained at that level for a long period of time. The thermal conductivity of the heat transfer fluid increased from 0.16 W/m.K to 0.19 W/m.K.

EXAMPLE 3

A heat transfer fluid composition was prepared using the following steps:

(1) 500 ml of commercially available hydrocarbon based HTF, Dynalene HF-LO (Dynalene, Inc., Whitehall, Pa.), was obtained and placed in a glass beaker. The glass beaker was placed in an ice bath. A sample of the fluid was removed and tested for moisture content and thermal conductivity.

(2) 20 g of porous and fibrous carbon material (from Y-Carbon, Inc., King Of Prussia, Pa.) of average diameter 10 nm and length 1 micron (aspect ratio of 1:100) was added to the hydrocarbon carrier fluid.

(3) A homogenizer and a sonicator (wand type) were placed in the fluid.

(4) Homogenization and sonication were carried out simultaneously for about 1 hour.

(5) A sample of the heat transfer fluid was removed and tested for the particle/agglomerate size distribution. An average size of 500 nm was obtained.

(6) The sample of the heat transfer fluid was also tested for moisture content and thermal conductivity.

(7) The moisture content of the heat transfer fluid was reduced from about 200 ppm to about 40 ppm and maintained there for a long period of time. The thermal conductivity of the heat transfer fluid increased from 0.16 W/m.K to 0.2 W/m.K.

EXAMPLE 4

A heat transfer fluid composition was prepared using the following steps:

(1) 100 ml of commercially available poly alpha olefin or PAO fluid (Chevron Chemicals) was obtained and placed in a glass beaker. The glass beaker was placed in an ice bath.

(2) 16.0 g of 13× molecular sieve purchased from Aldrich Chemicals was ground to 100 nm particles using a micronizer device. The resultant particles were added to the silicone fluid in the beaker to obtain a 20% concentration by weight.

(3) A homogenizer and a sonicator (wand type) were placed in the fluid.

(4) Homogenization and sonication were carried out simultaneously for about 3 hours, but intermittently stopping the process to add more ice to the ice bath. The homogenizer and sonicator produce a significant quantity of heat when used.

(5) The 100 ml concentrated dispersion obtained in Step 4 was added to a 1000 ml beaker containing 700 ml of PAO fluid. A mechanical mixer was used to mix the concentrate into the PAO fluid.

(6) A sample of the heat transfer fluid was removed and tested for the particle/agglomerate size distribution. An average size of 800 nm was obtained.

(7) The sample of the heat transfer fluid was also tested for moisture content and thermal conductivity.

(8) The moisture content of the fluid was reduced from about 200 ppm to about 55 ppm and maintained there for a long period of time. The thermal conductivity went up from 0.15 W/m.K to 0.18 W/m.K.

EXAMPLE 5

A heat transfer fluid composition was prepared using the following steps:

(1) 500 ml of commercially available hydrocarbon based HTF, Dynalene LO-230 (Dynalene Inc.), was obtained and placed in a glass beaker. The glass beaker was placed in an ice bath. A sample of the fluid was removed and tested for moisture content and thermal conductivity.

(2) 10 g of porous silica nano-powder (from US Research Nanomaterials, Inc., Houston, Tex.) of average diameter 20-30 nm was added to the hydrocarbon fluid.

(3) A homogenizer and a sonicator (wand type) were placed in the fluid.

(4) Homogenization and sonication were carried out simultaneously for about 1 hour.

(5) A sample of the heat transfer fluid was removed and tested for the particle/agglomerate size distribution. An average size of 500 nm was obtained.

(6) The sample of the heat transfer fluid was also tested for moisture content and thermal conductivity.

(7) The moisture content of the heat transfer fluid was reduced from about 200 ppm to about 100 ppm and maintained at that level for an extended period of time. The thermal conductivity of the heat transfer fluid increased from 0.16 W/m.K to 0.175 W/m.K.

FIG. 1 exemplarily illustrates a manufacturing set-up 100 for manufacturing a heat transfer fluid containing nano-additives 103. The nano-additive particles 103 are mixed with a carrier fluid 102 contained in a container 101 to produce the heat transfer fluid. The porous nano-additive particles 103 are mixed and dispersed in the carrier fluid 102 using an ultra-sonicator 104 and a high speed homogenizer 105. The homogenizer 105 is used to continuously mix the dispersion, while the ultra-sonicator 104 breaks down any agglomerates. Particle size and moisture content as a function of dispersion time may be measured to determine whether the dispersion is stable.

Figure 2:
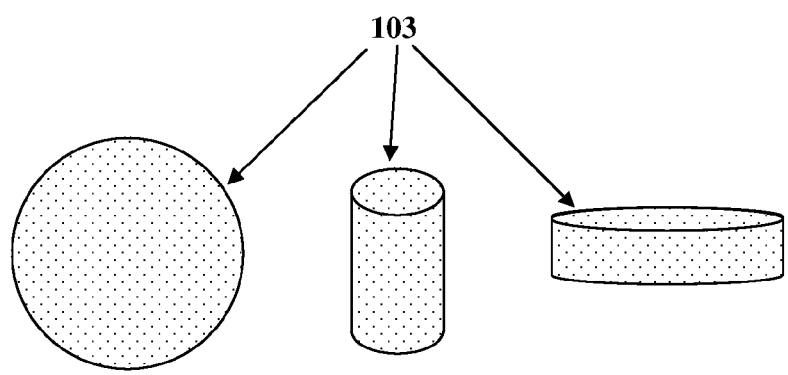
FIG. 2 exemplarily illustrates porous nano-additives having different aspect ratios.

FIG. 2 exemplarily illustrates porous nano-additives 103 having different aspect ratios. High aspect ratio nano-additives 103, for example, rods, tubes, and plates improve the thermal conductivity and the heat transfer efficiency of the heat transfer fluid at a rate higher than the low aspect ratio nano-additives 103, for example, spheres. The range of the aspect ratio selected for the nano-additive 103 is from 1 for spheres to about 10,000 for carbon nano-fibers.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A heat transfer fluid without a dispersant, adapted for increased thermal conductivity and reduced moisture content, comprising:

a carrier fluid consisting of poly alpha olefin (PAO);

a plurality of nano-additives with a porous structure consisting of zeolite:

said plurality of nano-additives having an average diameter of about 0.5 nm to about 5000 nm and an aspect ratio of about 1.0 to about 10,000, wherein said diameter and said aspect ratio of said nano-additives determine rate of improvement of said thermal conductivity of said heat transfer fluid;

said plurality of nano-additives having a porosity of about 40% to about 85%, wherein said porosity determines amount of moisture that can be trapped by the plurality of nano-additives, and further determines true density of said plurality of nano-additives;

said plurality of nano-additives having a true density of about 0.4 g/cc to about 3.0 g/cc, wherein low density nano-additives are used with a low density carrier fluid for better stability of dispersion, and wherein higher density nano-additives are used with a higher density carrier fluid;

said plurality of nano-additives having an average pore diameter of about 0.1 nm to about 100 nm, wherein said plurality of nano-additives are configured to adsorb from about 1% to about 20% of their weight of moisture from said carrier fluid in said porous structure of said nano-additives;

said plurality of nano-additives having a specific surface area of about 1 $m^2/g$ to about 4000 $m^2/g$, wherein said specific surface area and said pore diameter are configured to ensure the moisture content in said heat transfer fluid is limited to less than 200 parts per million; and said plurality of nano-additives configured to increase thermal conductivity of said heat transfer fluid by at least 5%.

2. The heat transfer fluid of claim 1, wherein said plurality of nano-additives comprise nano-particles having one or more of a spherical shape, a cylindrical shape, a plate-like shape, and a fibrous shape.

3. The heat transfer fluid of claim 1, wherein the density of said plurality of nano-additives is about 10% to about 200% of the density of said carrier fluid.

4. The heat transfer fluid of claim 1, wherein said plurality of nano-additives are about 0.01% to about 20% by weight of said heat transfer fluid.

* * * * *